United States Patent
Ternovetsky et al.

(10) Patent No.: US 8,757,023 B2
(45) Date of Patent: Jun. 24, 2014

(54) REVERSIBLE GEARBOX HAVING USER SELECTABLE INPUTS FOR OPERATION OF AN OUTPUT IN OPPOSING DIRECTIONS

(75) Inventors: Murray Ternovetsky, Winnipeg (CA); Philip Lester, Oak Bank (CA)

(73) Assignee: Star Industries (Manitoba) Ltd., Winnipeg, Manitoba (CA)

( * ) Notice: Subject to any disclaimer, the term of this patent is extended or adjusted under 35 U.S.C. 154(b) by 144 days.

(21) Appl. No.: 13/315,983

(22) Filed: Dec. 9, 2011

(65) Prior Publication Data
US 2013/0081513 A1 Apr. 4, 2013

(30) Foreign Application Priority Data
Sep. 30, 2011 (CA) .................. 2753839

(51) Int. Cl.
*F16H 3/14* (2006.01)
(52) U.S. Cl.
USPC ............................. 74/377; 74/665 GA
(58) Field of Classification Search
USPC ............... 74/377, 665 F, 665 GA, 665 G
See application file for complete search history.

(56) References Cited

U.S. PATENT DOCUMENTS

| 2,502,356 A | * | 3/1950 | Wagner | 74/377 |
| 2,872,002 A | * | 2/1959 | Blaum | 192/21.5 |
| 2,872,003 A | * | 2/1959 | Nussbaumer et al. | 192/51 |
| 2,885,900 A | * | 5/1959 | Wormley et al. | 74/377 |
| 3,006,209 A | * | 10/1961 | Stromberg | 74/377 |
| 3,479,895 A | * | 11/1969 | Wegener | 74/333 |
| 4,924,720 A | * | 5/1990 | Shust | 74/377 |
| 6,367,345 B1 | * | 4/2002 | Yeh | 74/377 |
| 7,389,712 B2 | * | 6/2008 | Himmelmann | 74/665 B |
| 2003/0060320 A1 | | 3/2003 | Woodcock | |

* cited by examiner

*Primary Examiner* — Ha D Ho
(74) *Attorney, Agent, or Firm* — Kyle R. Satterthawaite; Ryan W. Dupuis; Ade & Company Inc.

(57) ABSTRACT

A reversible gearbox features a first input gear mounted on for rotation about a first axis and a second input gear mounted for rotation about a second axis parallel to the first axis in a counter-rotational relationship with the first input gear. The input gears are arranged for selective coupling of either one thereof to a drive source rotatable in a predetermined direction, whereby at least one output gear is arranged within the gear train for driven rotation of the output gear in opposite directions depending on which of the first and second input gears is driven in the predetermined direction by the drive source. Accordingly, a unidirectional drive source can be used to drive the gearbox output in either direction by selecting from different input connections. The gearbox may be employed for an agricultural auger to be driven by the power take-off of a tractor.

18 Claims, 6 Drawing Sheets

REVERSIBLE GEARBOX HAVING USER SELECTABLE INPUTS FOR OPERATION OF AN OUTPUT IN OPPOSING DIRECTIONS

CROSS REFERENCE TO RELATED APPLICATIONS

This application claims benefit under 35 U.S.C. 119(A) of Canadian Patent Application No. 2,753,839, filed Sep. 20, 2011.

FIELD OF THE INVENTION

The present invention relates generally to gearboxes, and more particularly to gearboxes in which an output can be driven either rotational direction by selecting between two different input connection points arranged for releasable connection to a drive source that operates in a predetermined rotational direction.

BACKGROUND OF THE INVENTION

It is well known in the field of the agricultural machinery to employ a parallel-shaft gearbox to transmit rotational power from the power take-off driveline of an agricultural tractor to the shaft of an auger or screw-conveyor used to convey grain, for example for filling of grain into storage bin. The power take-off driveline couples to an input shaft of the gearbox, which is aligned parallel to the drive shaft of the auger, which carries helical flighting therearound within a surrounding tubular shell so that rotation of the drive shaft causes the flighting to convey granular material disposed between adjacent wraps of the flighting internally along the tube in a predetermined direction, for example to lift the grain from near ground level to the access opening at the top of a grain bin.

Although grain is typically conveyed in the predetermined direction along the auger tube, for example for the bin-filling operation briefly summarized above, it can be desirable to reverse the conveying direction by reversing the rotational direction of the auger shaft, for example for cleaning out the auger for use with a different granular material or in case the auger should become plugged.

The U.S. Patent Application published under Publication No. 2003/0060320 discloses gearboxes for reversing the direction of an auger, but only in a right-angle gearbox configuration in which the input and output shafts of the gearbox are oriented at ninety degrees to one another, and in which the auger is provided with its own dedicated motor. Accordingly, this prior art does not provide a suitable solution for power take-off operation of an auger with a parallel-shaft drive configuration.

It is therefore desirable to provide a gearbox apparatus and operation method suitable to provide direction-reversible output from a power take-off driveline or similar drive source that is operable, or convenient to operate, in only a single predetermined rotational direction.

SUMMARY OF THE INVENTION

According to a first aspect of the invention there is provided a reversible gearbox comprising:
a frame;
a gear train carried on the frame and comprising:
a first input gear rotatably mounted on the frame for rotation about a first axis;
a second input gear rotatably mounted on the frame for rotation about a second axis parallel to the first axis and arranged within the gear train in a counter-rotational relationship with the first input gear, the input gears being arranged for selective coupling of either one thereof to a drive source rotatable in a predetermined direction; and
at least one output gear arranged within the gear train for driven rotation of the output gear in opposite directions depending on which of the first and second input gears is driven in the predetermined direction by the drive source.

Preferably the first and second input gears are defined on first and second hollow input shafts respectively, into each of which a mating shaft is insertable for use in establishing a connection of the respective input gear to the drive source.

Preferably the mating shaft is arranged for selective and removable attachment thereof to the drive source.

Preferably the mating shaft is arranged for selective and removable attachment to a power take-off driveline of an agricultural machine.

Preferably an exterior of the mating shaft and an interior surface of each hollow input shaft are matingly profiled to engage one another in a manner blocking rotation of the mating shaft relative to the hollow input shaft when inserted therein.

Preferably there are provided external splines on the mating shaft and internal splines on each of the hollow input shafts.

Preferably there is provided a locking mechanism operable to selectively and releasably form a locked connection of the drive source to the gearbox.

Preferably the locking mechanism is self locking.

Preferably the locking mechanism is a quick release locking mechanism adapted for tool-free release of the locked connection of the drive source to the gearbox.

Preferably the locking mechanism is a ball detent locking mechanism operable to secure the mating shaft to a select one of the hollow input shafts when inserted therein.

Preferably the ball detent locking mechanism comprises at least one ball carried on each hollow input shaft and biased into a latching position projecting into a hollow interior thereof, and a detent formed at an exterior of the mating shaft.

Preferably the ball detent locking mechanism further comprises a sliding collar that is disposed externally around each hollow input shaft, biased into a locking position blocking movement of the ball out of the latching position, and slidable out of the locking position into a release position allowing the ball to depart the latching position.

Preferably the sliding collar has a stepped inner diameter having a smaller diameter portion that overlies the ball in the locking position and a larger diameter portion that overlies the ball in the release position.

Preferably the frame is defined by a housing containing the gear train and the locking mechanism is disposed externally of the housing.

Preferably the hollow input shafts project outside the housing, and the ball detent locking mechanism is accessible for unlocking from outside the housing.

According to a first aspect of the invention there is provided a method of reversing a rotational output direction of a gearbox, the method comprising:
decoupling a drive source operable in a predetermined rotational direction from a first input gear in a gear train of the gearbox;

coupling the same drive source to a second input gear arranged in the gear train in a counter-rotational relationship with the first input gear; and operating the same drive source in the same predetermined rotational direction in order to drive an output gear of the gear train in a direction opposite that in which it would rotate under operation of the drive source in said predetermined rotational direction when coupled to the first input gear.

BRIEF DESCRIPTION OF THE DRAWINGS

In the accompanying drawings, which illustrate exemplary embodiments of the present invention.

DETAILED DESCRIPTION

Figure 1:
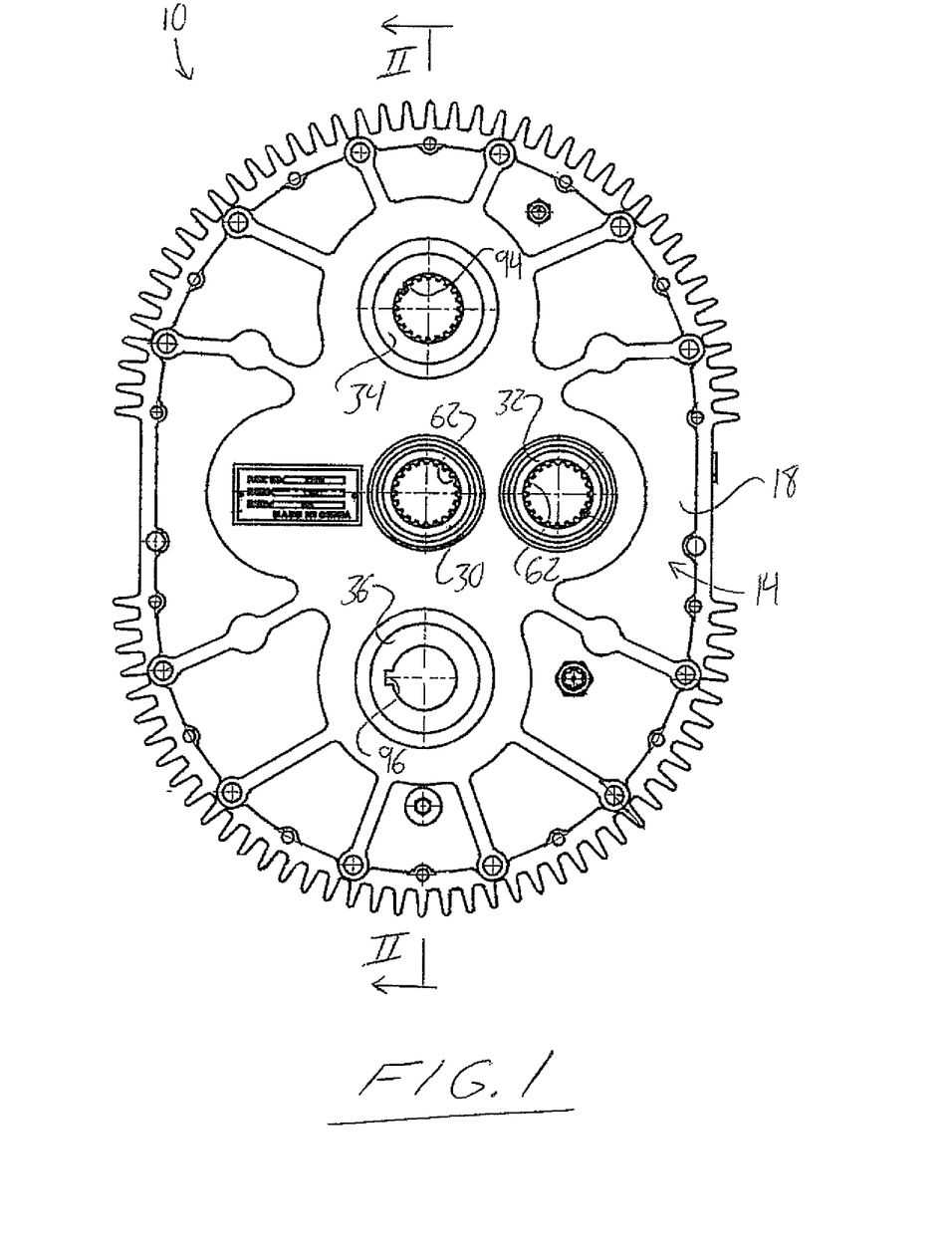
FIG. 1 is a side elevational view of a parallel-shaft reversible gearbox of the present invention.
Figures 2, 3:
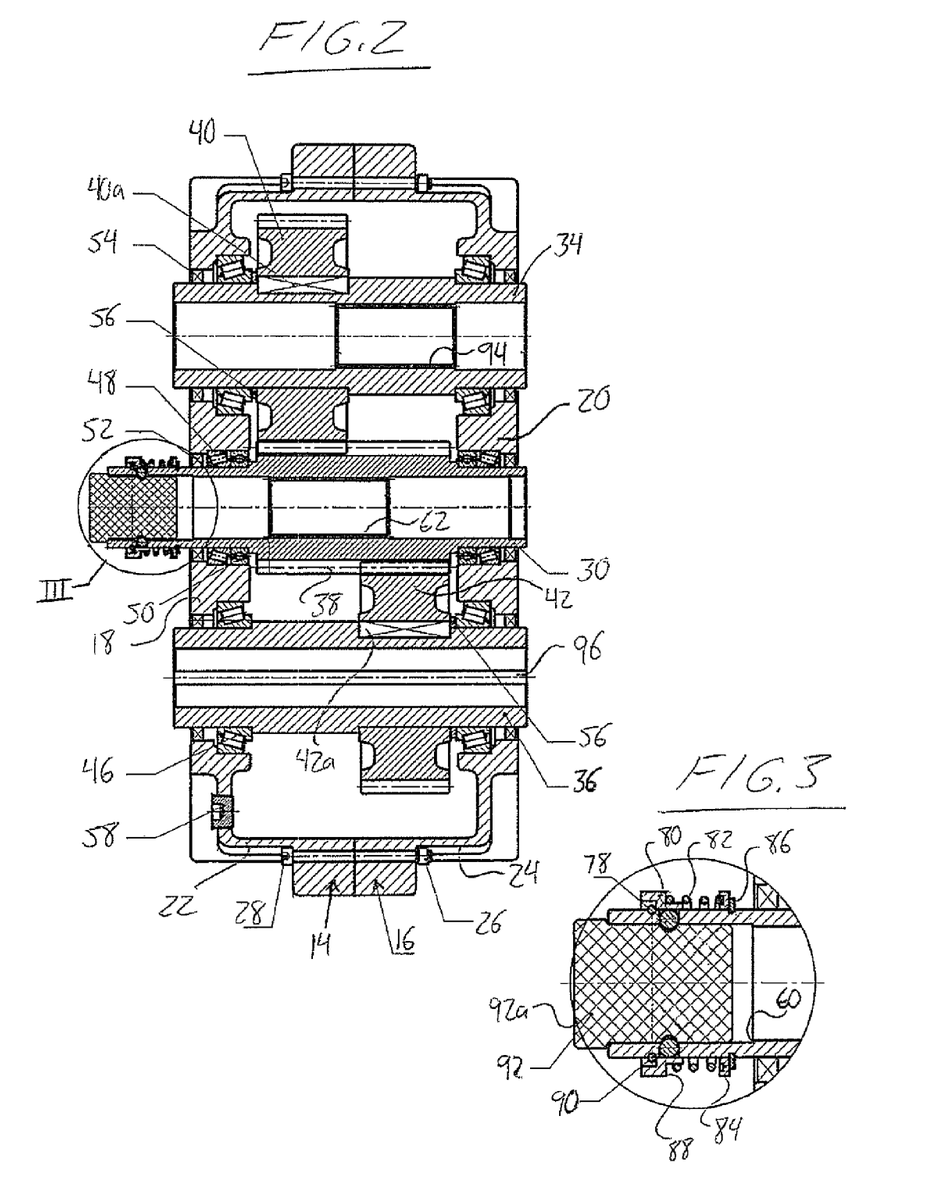
FIG. 2 is a cross-sectional view of the gearbox of FIG. 1 as taken along line II-II thereof.
FIG. 3 is an enlarged partial view of the gearbox of FIG. 2, particularly the portion thereof highlighted by circle III.

FIGS. 1 and 2 illustrate a parallel-shaft reversible gearbox 10 according to one embodiment of the present invention. The gearbox features a housing 12, which is shown in FIG. 2 as featuring to shell-like halves 14, 16 each having a generally open face at one side thereof, a substantially closed face defined at an opposing side by a wall 18, 20, and a rim 22, 24 projecting from the respective wall 18, 20 to the open face around the perimeter of the wall. The shells are generally mirror images of one another, and mate together at flat surfaces defined around the open face by the free ends of the rims opposite the walls 18 so as to enclose an internal cavity of the housing between the two shells, which are then fastened or fixed together, for example by nuts 26 and bolts 28 engaged together at bores aligned with one another around the mating rims of the shells.

Four through holes in the wall 18, 20 of each shell 14, 16 axially align with four respective through holes in the wall of the other shell. Extending through each aligned pair of holes is a respective hollow or female shaft axially rotatably supported in concentric axial alignment with said holes by a respective set of bearings, numbering at least one bearing per hollow shaft at each shell wall. With reference to the illustrated orientation of the gearbox in the drawings, two of the hollow shafts 30, 32 are positioned horizontally adjacent one another, with a first one of these shafts 30 at a lateral center of the housing 12 and the second shaft 32 a short distance laterally outward therefrom. These two hollows shafts 30, 32 define two different points at which the gearbox can be selectively coupled, one shaft at a time, to a rotational drive source, such as the driveline of the power take-off system of an agricultural tractor. The remaining two hollow shafts 34, 36 are position above and below the first hollow input shaft 30 with the axes of these three shafts residing in a common vertical plane. This second pair of hollows shafts 34, 36 defined two different points at each of which the gearbox can be selectively coupled to a respective member to be rotatably driven by operation of the gearbox. The direction in which each hollow output shaft 34, 36 rotates is determined by which of the two hollow input shafts 30, 32 is being driven by the rotational source. That is, a drive source being driven in the same predetermined rotational direction regardless of which hollow input shaft it is coupled to will cause each hollow output shaft to rotate in one direction if used at the first hollow input shaft 30, and cause the same output shaft to rotate in the opposite direction if used at the second hollow input shaft 32.

With reference to FIG. 2, the first hollow input shaft 30 has external splines 38 defined thereon that engage with first and second output gears 40, 42 rotationally fixed to the first and second hollow output shafts 34, 36 respectively by external keys 40a, 42a thereon for rotation therewith. Accordingly, when the input gear defined by the externally splined first hollow input shaft 30 is rotated in a first direction, each of the hollow output shafts 34, 36 will be rotationally driven in the opposite direction. The second hollow input shaft 32 is identical to the first hollow input shaft 30, and the external splines 38 on the first hollow input shaft 30 engage with the external splines 44 of the second hollow input shaft 32. Accordingly, like each of the hollow output shafts 34, 36, the second hollow input shaft 32 is in a counter-rotational relationship with the first hollow input shaft 30, so that rotation of either hollow input shaft in one direction will drive rotation of the other hollow input shaft in the opposite direction. This rotational coupling or geared relation of the hollow input shafts is not visible in FIG. 2, but can be seen in the similar gearbox of FIG. 7.

The gearbox thus features a four-gear gear train consisting of the two externally splined hollow input shafts and the two output gears 40, 42 externally keyed on the two hollow output shafts. The illustrated embodiment uses splined shafts at the input and larger keyed gears at the output to reduce speed an amplify torque, but it will be appreciated that gear trains employing different numbers of gears of varying sizes in different configurations may similarly use two input gears of counter-rotational relationship to drive one or more outputs in opposing directions.

As described in further detail below, each hollow input shaft is arranged for selective coupling thereof to a rotational drive source, such as the power take-off of an agricultural tractor. Accordingly, an owner or operator can choose which of the two input shafts to couple such a unidirectional rotary drive source to based on the desired direction of rotational output from the gearbox. For example, with reference to FIG. 1, coupling a rotational drive source to the first hollow input shaft 30 that rotates clockwise from the illustrated viewpoint will rotate each of the hollow output shafts 34, 36 in the counterclockwise direction opposite the input rotation. On the other hand, coupling the same rotational drive source to the second hollow input shaft 32 will instead rotate each of the hollow output shafts 34, 36 in the same clockwise direction as the input rotation. Accordingly, the gearbox can be driven to provide output in either direction by a unidirection drive source without requiring substitution by a second drive source of opposing rotational direction or insertion of an additional gearbox or other mechanism operable to provide a direction change between the drive source and the gearbox of the present invention.

Each through hole in the wall of each shell is stepped in diameter so as to have a larger diameter at the inside face of the wall than at the outside face of the wall. The shoulder formed at the stepped transition between the two diameters and the perimeter of the larger diameter portion thus form a seat in which one or more bearings are received. In the illustrated embodiment, each hollow output shaft 34, 36 is rotatably supported on the housing by two tapered roller bearings 46 near opposite ends of the shaft at the respective seats at the interior of the respective shell walls. In the embodiment of FIG. 2, each hollow input shaft 30, 32 is rotatably supported on the housing by two tapered roller bearings 48 near opposite ends of the shaft at the respective seats at the interior of the respective shell walls, and two ball bearings 50 each residing in a respective one of the seats at the inner side of the respective one of the tapered roller bearings. At the smaller diameter outer portions of the shaft-receiving holes in the housing shells, a seal 52, 54 is provided between the housing shell and each of the hollow shafts, 30, 32, 34, 36 to protect the contents of the housing from exposure to the elements, debris, etc. The embodiment of FIG. 2 also features shims 56 to block axial translation of the hollow output shafts 34, 26 and a removable plug 58 on one of the housing shells for lubricating the gears in the housing cavity.

With reference to FIG. 2, each hollow input shaft 30, 32 projects further from the first shell 14 of the housing than the second shell 16. The outer diameter of the hollow input shaft 30, 32 remains consistent from this first end of the hollow shaft to a point inside the housing cavity at the inner face of the ball bearing 50, where it steps up to form a shoulder where the ball bearing and hollow shaft abut against one another. The illustrated embodiments feature another increasing step in the outer diameter to step-up the shaft's wall thickness over the axial length of the external splines that project from the rest of the shaft wall. Approaching the second end of the hollow input shaft from inside the housing cavity, the hollow input shaft features two stepwise reductions in outer diameter to transition from the end of the externally splined section and onward through the respective ball bearing from a stop shoulder abutting thereagainst. The shaft's external diameter is thus similarly stepped-up from both ends of the shaft toward the externally splined portion of the shaft in two steps, except that the minimum outer diameter of the shaft is longer at one end than the other. It is at this further-projecting end of the hollow input shaft that coupling to a drive source is achieved.

The inner diameter of each hollow input shaft is also stepped to change along the length of the shaft. Moving from the projecting end of the hollow input shaft, a reduction 60 in inner diameter occurs at a distance inward therefrom, particularly near the plane of the outer face of the wall 18 of the first housing shell 14 for the embodiment illustrated in FIG. 2. At a distance further along the shaft axis from this diameter reducing transition 60, the inner wall surface of the hollow input shaft is splined over a portion of the shaft's length between the walls of the housing shells. This internally splined area is shown generally at 62.

Figure 4:
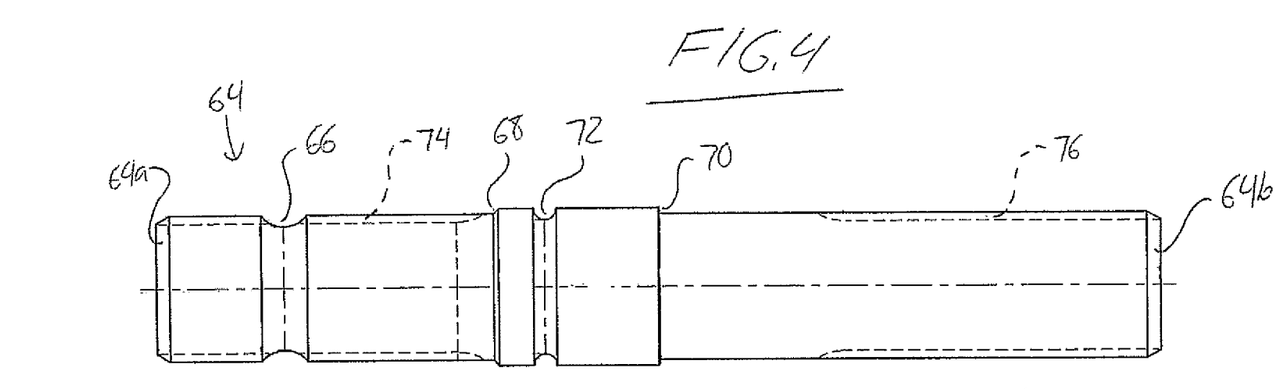
FIG. 4 is an elevational view of an insertable input shaft of the gearbox of FIG. 1.
Figure 5:
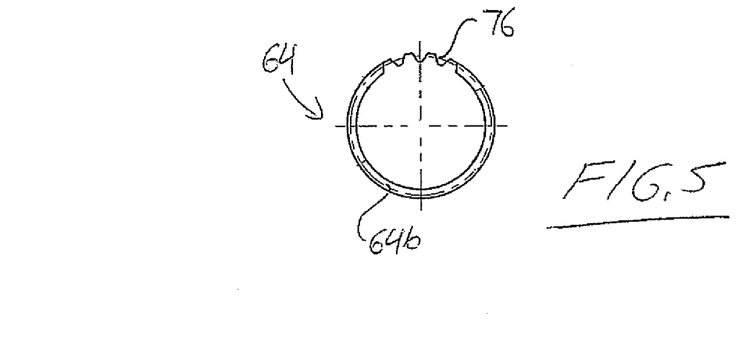
FIG. 5 is an end view of the insertable input shaft of FIG. 4.

FIGS. 4 and 5 show a male input shaft 64 that is insertable into the hollow interior of either hollow input shaft 30, 32 and lockable thereto in a fixed rotational relationship (i.e. for rotational movement therewith). At an axial distance from a first tapered end 64a of the male input shaft 64, this shaft 64 features a first circumferential recess 66 that has an arcuate cross-section in radial planes of the shaft. At an axial distance further along the shaft 64 from the first end 64a thereof, the outer diameter of the shaft 64 increases at a sloped transition 68 before decreasing back down at step or shoulder 70 a distance further along the shaft axis. From the step 70, the shaft continues to extend in an axial direction to the second tapered end 64b of the shaft 64. At an intermediate location between the ends of the enlarged shaft portion defined between the sloped transition 68 and the stepped transition 70, a second circumferential recess 72 of arcuate cross-section in radial planes of the shaft 64 is provided at this otherwise uniform-diameter enlarged portion of the male shaft 64.

The male shaft 64 has two externally splined portions, each extending from a respective tapered end 64a, 64b of the male shaft 64 toward, without reaching the enlarged-diameter portion, as generally shown at 74 and 76. Except for the tapered shaft ends 64a, 64b and the first circumferential recess 66, all parts of the illustrated shaft outward from the enlarged portion are of uniform outer diameter (with the outer diameter of the splined portions referring to the radially outermost extent of the splines). For ease of illustration, the splines of the male input shaft are shown only at select parts of the circumference thereof in FIGS. 4 and 5, but the splined area spans around the full circumference of the shaft in the preferred embodiments.

To initiate connection of the male shaft 64 to either female input shaft 30, 32, the second tapered end 64b of the male shaft 64 is inserted into the selected female input shaft at the end thereof projecting further outward from the housing cavity, and with the male shaft in an angular position aligning its external splines with the spaces between internal splines of the female shaft, the male shaft is pushed further into the female shaft until fully seated, which may be defined by abutment of the shoulder 70 at the outer diameter reduction of the male shaft 64 against the corresponding shoulder at the female shaft's inner diameter decrease 60. This positions the external splines of the male input shaft 64 between the internal splines of the female input shaft 30, 32. With reference to FIG. 3, this seating of the male shaft 64 also positions the second circumferential recess 72 of the male shaft in alignment with two or more balls 78 captured in radial bores that extend through the wall of the female input shaft 30, 32 at an axial position along the shaft outside the first housing shell 14. The radial bores have reduced diameters at their inner ends that are less than the ball diameters in order to prevent the balls 78 from fully entering the interior bore of the female shaft. The larger diameter remainder of each radial bore is larger than the ball diameter, and the reduced diameter portion of the radial bore is of a length allowing a portion of the ball 78 to project into the hollow interior of the female shaft from the surrounding wall thereof. The balls are part of a ball detent locking mechanism, which as describe below, biases the balls inward toward the interior of the female shaft so as to project into the second circumferential recess 72 of the seated male shaft, thereby preventing inadvertent withdrawal of the male shaft from the selected female shaft.

Still referring to FIG. 3, a stepped collar 80 is slidably disposed around the portion of the female input shaft that projects from the first housing shell 14. A smaller diameter portion of the collar 80 has an inner diameter sized to fit closely over the female shaft so as to maintain each ball 78 in the locking position projecting into the female shaft's interior when positioned over the radial bores, but loose enough to slide along the exterior of the female shaft into and out of such a locking position overlying the radial bores and the balls therein. A larger diameter portion of the collar located further from the housing 12 has a larger inner diameter, that when positioned over the radial bores allows each of the balls 78 to project partially outward from the outer surface of the female shaft's circumferential wall by an amount fully withdrawing the ball from the interior of the female shaft. A compression spring 82 coils around the female input shaft between a spring washer 84 seated against a first snap ring 86 located a short distance outside the wall 18 of the first housing shell 14 and an outer shoulder 88 of the collar 80 defined where the outer diameter thereof increases from the smaller diameter collar portion to the larger diameter collar portion. A second snap ring 90 is secured on the exterior of the female shaft at a location between the projecting end of the female shaft and the radial bores containing the balls 78. The second snap ring projects from the exterior of the female input shaft by an amount sufficient to block the smaller diameter portion of the collar 80, but small enough to fit under the larger diameter portion of the collar.

Still referring to FIG. 3, the spring 82 biases the collar 80 into a default locking position placing the smaller diameter portion of the collar 80 over the radial bores and the balls 78 captured therein. To insert the male shaft into an empty female shaft, the collar 80 is pushed toward the housing 12, thereby sliding the collar along the exterior of the female shaft toward the housing 12 until it reaches an unlocking position in which the larger diameter portion overlies the radial bores and the balls 78 therein. The end of the male shaft is inserted into the open end of the female shaft and pushed further thereinto. The outer diameter of the male shaft forces the balls 78 radially outward from the female shaft interior when pushed past the axial location of the radial bores along the female shaft, while the collar 80 prevents full release of the balls from the radial bores in the female shaft wall. When the male shaft is fully seated, the second circumferential recess 72 therein accommodates return of the balls 78 to their default locking positions projecting partially into the female shaft interior. The collar 80 is released, and the spring 82 biases it back into its normal default position, which forces any ball 78 not gravitationally forced into its locking position into such position, and maintains the balls in this condition, thereby locking the male shaft in the seated position inside the female shaft. The engaged splines of the male and female shaft will cause the female shaft to rotate with the male shaft when driven.

In this ball detent locking system, movement of the collar 80 toward the housing is prevented from moving the larger diameter portion of the collar past the balls 78 by ensuring that a maximum compression of the spring is achieved before this can happen. This locking system is self-locking, as the step of engaging the balls into the detent defined by the circumferential recess of the male shaft is automatically executed under the action of the spring, and is also of a quick-release type where no tool is required to unlock the male shaft from its seated position, as this is simply achieved by manual displacement of the collar 80 along the female shaft and subsequent pulling out of the male shaft.

When the male shaft 64 is fully seated and locked in one of the female input shafts 30, 32, the first tapered end 64a, first splined portion 74 and first circumferential recess 66 of the male shaft are all projected outward from the respective end of the female input shaft, and thus are available to connect to an internally splined female output shaft of a tractor's power take-off so that engagement of splines between the removable male shaft of the gearbox apparatus and the power take-off output will drive rotation of the inserted male input shaft and surrounding female input shaft in which it is locked, and a ball detent coupling mechanism can engage the male shaft at the first circumferential recess 66 to lock the male stub shaft 64 to a constant velocity joint at the output end of the the power take-off driveline.

A user of the present invention can thus select which of the two available female input shafts to couple the drive source to in order to achieve the desired direction of rotational output from the gear train of the gearbox, and accordingly connect the removable male stub shaft 64 between the selected female input shaft 30, 32 and the unidirectional drive source.

FIG. 3 shows a plug 92 received in the projecting end of an unused one of the female input shafts. The plug has a larger end 92a of outer diameter greater than the inner diameter of the female input shaft at the projecting end thereof, and an opposing end of generally equal or slightly smaller diameter than the end portion of the female input shaft. A circumferential recess having an arcuate cross-section in radial planes of the plug cooperates with the balls 78 of the locking mechanism to lock the plug in place after insertion of the plug with the lock collar 80 initially pushed into the release position and subsequently released to the spring-biased locking position. The axial distance from the plug's circumferential recess to the shoulder defined between the larger-diameter cap portion of the plug and smaller-diameter insert portion thereof matches the distance from the radial bores of the female input shaft to the projecting end thereof so that forcing the plug into a fully seated position abutting its shoulder against the end of the female input shaft automatically aligns the plug's detent recess with the locking balls for automatic locking under release of the collar 80. Anytime one or both of the input shafts are not in use, the application of such a plug for each such unused input shaft will protect the interior thereof from granular material, environmental conditions, debris, etc.

The illustrated embodiments each feature two female output shafts, the first female output shaft 34 is internally splined over a part of its length located within the housing cavity, like, each of the female input shafts, as schematically shown at 94 in FIG. 2, so as to be rotationally engagable with an externally splined output shaft of the gearbox (or drive shaft or connecting shaft of the apparatus to be driven by the gearbox) insertable into the first female output shaft of the gear box. The second female output shaft 36 is not splined, but instead features an internal keyway 96 for engagement by an externally projecting key of an output/drive/connecting shaft for driven rotation thereof. However, it will be appreciated that the advantage of reversible output rotation may be accomplished for as few as one output, or more than two outputs, using the described configuration of two selectable inputs arranged in counter-rotating relationship with one another within a gear train, whether the inputs are directly geared to one another or rotationally interconnected by one or more intermediates in the gear train. Likewise, the benefits of such a configuration may be achieved regardless of the particular arrangement for coupling and/or locking the drive source to one of the two selectable input sites. Accordingly, varying combinations of male/female components between the gearbox and drive source, including possible use of additional couplers therebetween, may be employed, and different ball-detent configurations or other types of locking mechanism may similarly be used.

Figure 6:
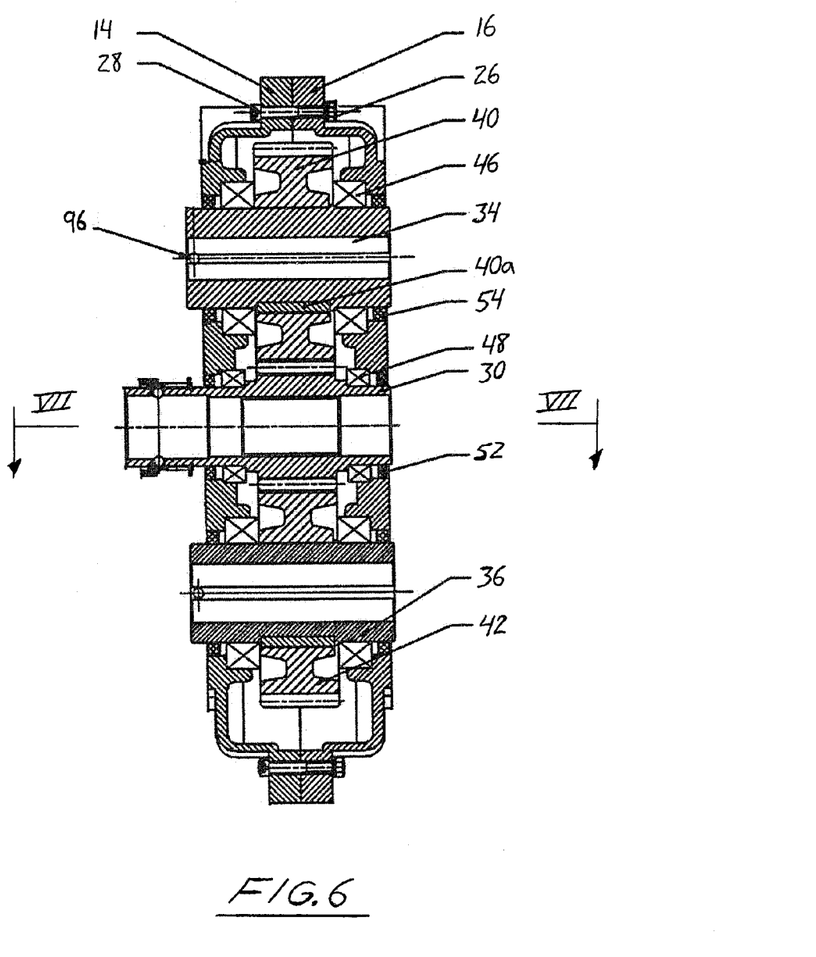
FIG. 6 is a cross-sectional view, like that of FIG. 2, for a similar parallel-shaft reversible gearbox.
Figure 7:
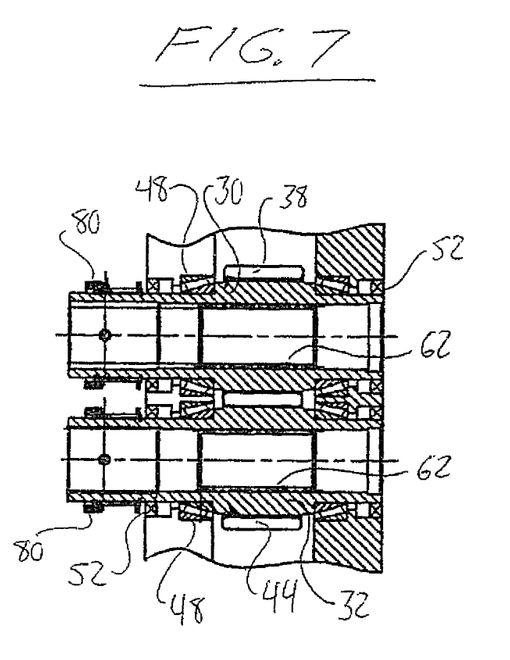
FIG. 7 is a cross-sectional view of the gearbox of FIG. 6, as taken along line VII-VII thereof.

The above description is made primarily with reference to FIGS. 1 to 5. FIGS. 6 and 7 show a gearbox of substantially the same configuration with relatively minor changes, including different dimensions such as a narrower housing with the output gears aligned in a common plane instead of offset in a lateral direction of the housing, only one set of bearings on each female input shaft, and use of two outputs both using keyed connections instead of splines. The gearbox of FIGS. 1 to 5 have the output gears offset from one another along the axes of the female input and output shafts so as to separate the areas of the first female input shaft that are engaged by these output gears, thereby reducing the degree of wear experienced at any given location along the shaft axis, as the shaft is only engaged by one gear at the given location, compared to the embodiments of FIGS. 6 and 7 where two gears engage the first input shaft at the same axial position therealong. Accordingly, the first embodiment may be more useful for higher power, greater torque applications than the second embodiment, but has increased material requirements and thus may have a greater production cost.

Figure 8:
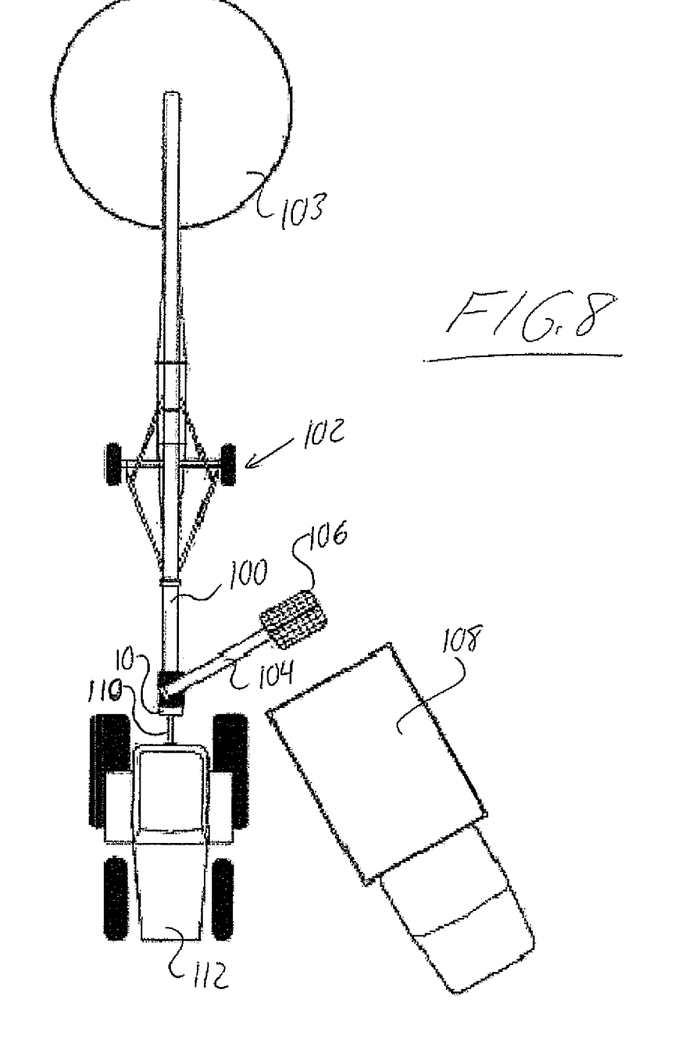
FIG. 8 is a schematic illustration showing use of a grain auger featuring a gearbox of the present invention.

FIG. 8 schematically illustrates use of a gearbox 10 of the present invention on agricultural grain conveyor of the type featuring a main or primary auger tube 100 carried by wheeled frame 102 for support in an inclined position elevating an output end of the main auger tube 100 over the inlet at the top of a grain bin 103, and a shorter feed or secondary auger tube 104 coupled to the lower end of the main auger tube 100 to empty thereinto. The feed auger tube 104 is arranged for repositioning of its inlet end on the ground through a sweeping action allowed by its coupling to the main auger tube, so that a loading hopper 106 at this ground-supported distal end of the feed auger tube can be selectively positioned beneath the discharge of a grain cart or truck 108. The parallel-shaft gearbox 10 is mounted at the lower end of the main auger tube 100, where the shaft receiving ends of the two female input shafts face away from the auger tube for access to these inputs by the PTO driveline 110 of a tractor 112. One of the female output shafts of the gearbox is rotatably coupled to the driveshaft of the main auger, and the other output shaft is linked to the driveshaft of the feed auger for driven rotation thereof. Accordingly, in driving the first female input shaft of the gearbox via the PTO driveline 110, the feed auger rotates in a normal direction in the feed auger tube 104 to convey grain from the loading hopper 108 to the inlet of the main auger tube 100, where the main auger then conveys the received grain up the inclined tube 100 to the outlet thereof, where the grain falls into the storage bin 103. Disconnecting the PTO driveline from the first female input shaft of the gearbox, and connecting it to the second female input shaft, reverses these auger rotation directions, for example to clean out the main auger tube by conveying any remaining grain therein back to the lower inlet end of the tube. This is just one example of possible applications for the gearbox of the present invention.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A reversible gearbox comprising:
a frame;
a gear train carried on the frame and comprising:
  a first input gear rotatably mounted on the frame for rotation about a first axis;
  a second input gear rotatably mounted on the frame for rotation about a second axis parallel to the first axis and arranged within the gear train in a counter-rotational relationship with the first input gear, the input gears being arranged for selective coupling of either one thereof to a drive source rotatable in a predetermined direction; and
  at least one output gear arranged within the gear train for driven rotation of the output gear in opposite directions depending on which of the first and second input gears is driven in the predetermined direction by the drive source;
wherein the first and second input gears are disposed on first and second hollow input shafts respectively, into each of which a mating shaft is insertable for use in establishing a connection of the respective input gear to the drive source.

2. The gearbox of claim 1 wherein the mating shaft is arranged for selective and removable attachment thereof to the drive source.

3. The gearbox of claim 1 wherein the mating shaft is arranged for selective and removable attachment to a power take-off driveline of an agricultural machine.

4. The gearbox of claim 1 wherein an exterior of the mating shaft and an interior surface of each hollow input shaft are matingly profiled to engage one another in a manner blocking rotation of the mating shaft relative to the hollow input shaft when inserted therein.

5. The gearbox of claim 1 comprising external splines on the mating shaft and internal splines on each of the hollow input shafts.

6. The gearbox of claim 1 comprising a locking mechanism operable to selectively and releasably form a locked connection of the drive source to the gearbox.

7. The gearbox of claim 6 wherein the locking mechanism is self locking.

8. The gearbox of claim 6 wherein the locking mechanism is a quick release locking mechanism adapted for tool-free release of the locked connection of the drive source to the gearbox.

9. The gearbox of claim 1 comprising a ball detent locking mechanism operable to secure the mating shaft to a select one of the hollow input shafts when inserted therein.

10. The gearbox of claim 9 wherein the ball detent locking mechanism comprises at least one ball carried on each hollow input shaft and biased into a latching position projecting into a hollow interior thereof, and a detent formed at an exterior of the mating shaft.

11. The gearbox of claim 10 wherein the ball detent locking mechanism further comprises a sliding collar that is disposed externally around each hollow input shaft, biased into a locking position blocking movement of the ball out of the latching position, and slidable out of the locking position into a release position allowing the ball to depart the latching position.

12. The gearbox of claim 11 wherein the sliding collar has a stepped inner diameter having a smaller diameter portion that overlies the ball in the locking position and a larger diameter portion that overlies the ball in the release position.

13. The gearbox of claim 6 wherein the frame is defined by a housing containing the gear train and the locking mechanism is disposed externally of the housing.

14. The gearbox of claim 9 wherein the frame is defined by a housing containing the gear train, the hollow input shafts project outside the housing, and the ball detent locking mechanism is accessible for unlocking from outside the housing.

15. A reversible gearbox comprising:
a frame;
a gear train carried on the frame and comprising:
  a first input gear rotatably mounted on the frame for rotation about a first axis;
  a second input gear rotatably mounted on the frame for rotation about a second axis parallel to the first axis and arranged within the gear train in a counter-rotational relationship with the first input gear, the input gears being arranged for selective coupling of either one thereof to a drive source rotatable in a predetermined direction;
  at least one output gear arranged within the gear train for driven rotation of the output gear in opposite directions depending on which of the first and second input gears is driven in the predetermined direction by the drive source; and
a locking mechanism operable to selectively and releasably form a locked connection of the drive source to the gearbox.

16. The gearbox of claim 15 wherein the locking mechanism is self locking.

17. The gearbox of claim 15 wherein the locking mechanism is a quick release locking mechanism adapted for tool-free release of the locked connection of the drive source to the gearbox.

18. The gearbox of claim 15 wherein the locking mechanism comprises a ball detent locking mechanism operable to secure the drive source to a select one of the input shafts.

* * * * *